United States Patent
Sugimori

(10) Patent No.: US 9,007,518 B2
(45) Date of Patent: Apr. 14, 2015

(54) IMAGE PICKUP SYSTEM, IMAGE CAPTURING METHOD, AND COMPUTER-READBALE STORAGE MEDIUM STORING PROGRAM FOR PERFORMING IMAGE CAPTURING METHOD

(75) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/243,667

(22) Filed: Sep. 23, 2011

(65) Prior Publication Data

US 2012/0013771 A1  Jan. 19, 2012

Related U.S. Application Data

(63) Continuation of application No. 12/395,079, filed on Feb. 27, 2009, now Pat. No. 8,115,861.

(30) Foreign Application Priority Data

Mar. 4, 2008  (JP) ................................. 2008-053628

(51) Int. Cl.
*H04N 5/222* (2006.01)
*H04N 5/228* (2006.01)
*H04N 5/232* (2006.01)
*H04N 5/235* (2006.01)
*H04N 5/272* (2006.01)

(52) U.S. Cl.
CPC ............ *H04N 5/272* (2013.01); *H04N 5/23232* (2013.01); *H04N 5/2354* (2013.01)

(58) Field of Classification Search
USPC ...................... 348/222.1, 221.1, 362, 370, 371
See application file for complete search history.

(56) References Cited

U.S. PATENT DOCUMENTS

| 6,088,470 A    | * | 7/2000  | Camus et al. ................. 382/117 |
| 2004/0212725 A1 | * | 10/2004 | Raskar ........................... 348/370 |
| 2005/0265707 A1 | * | 12/2005 | Chang ........................... 396/199 |
| 2009/0002774 A1 | * | 1/2009  | King et al. .................... 358/474 |

* cited by examiner

*Primary Examiner* — Twyler Haskins
*Assistant Examiner* — Peter Chon
(74) *Attorney, Agent, or Firm* — Canon U.S.A., Inc. IP Division

(57) ABSTRACT

An image pickup system causes a first illumination unit to emit light toward a subject at a first angle without causing a second illumination unit for emitting light toward the subject at a second angle different from the first angle, and causes an image pickup unit to capture the image of the subject so as to obtain a first captured image. The image pickup system causes the second illumination unit to emit light without causing the first illumination unit to emit light, and causes the image pickup unit to capture the image of the subject so as to obtain a second captured image. The image pickup system associates the first captured image with the second captured image.

13 Claims, 7 Drawing Sheets

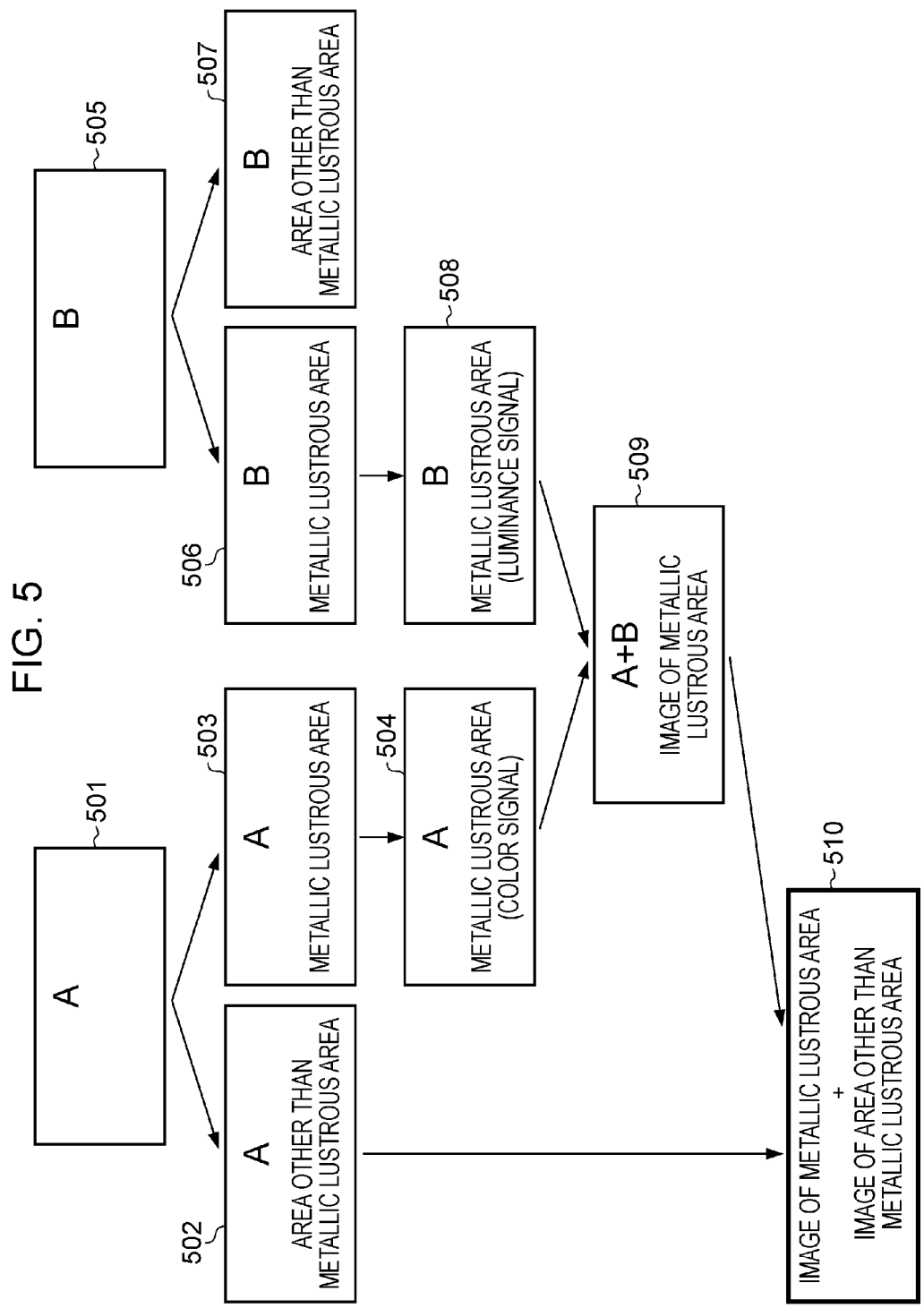

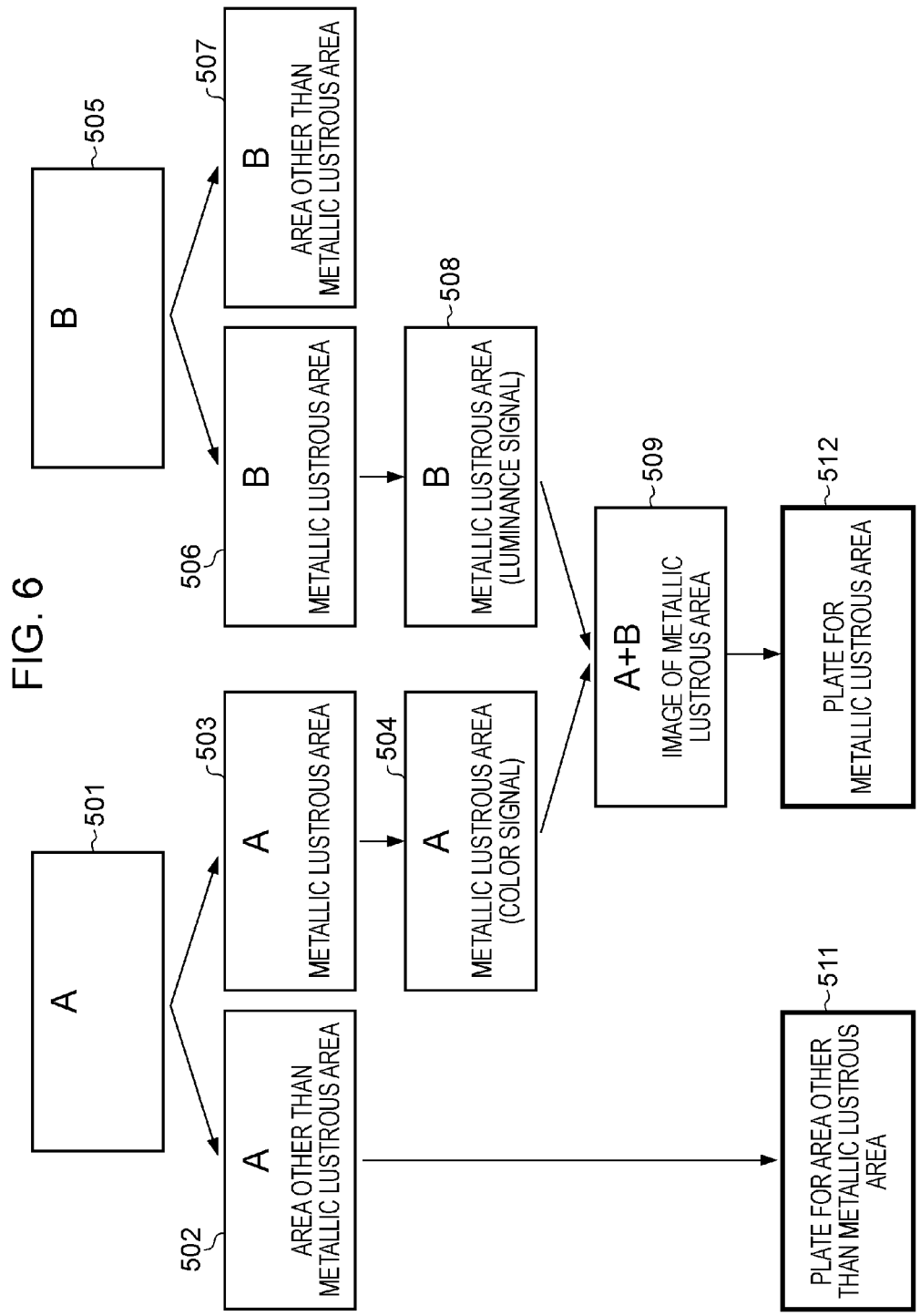

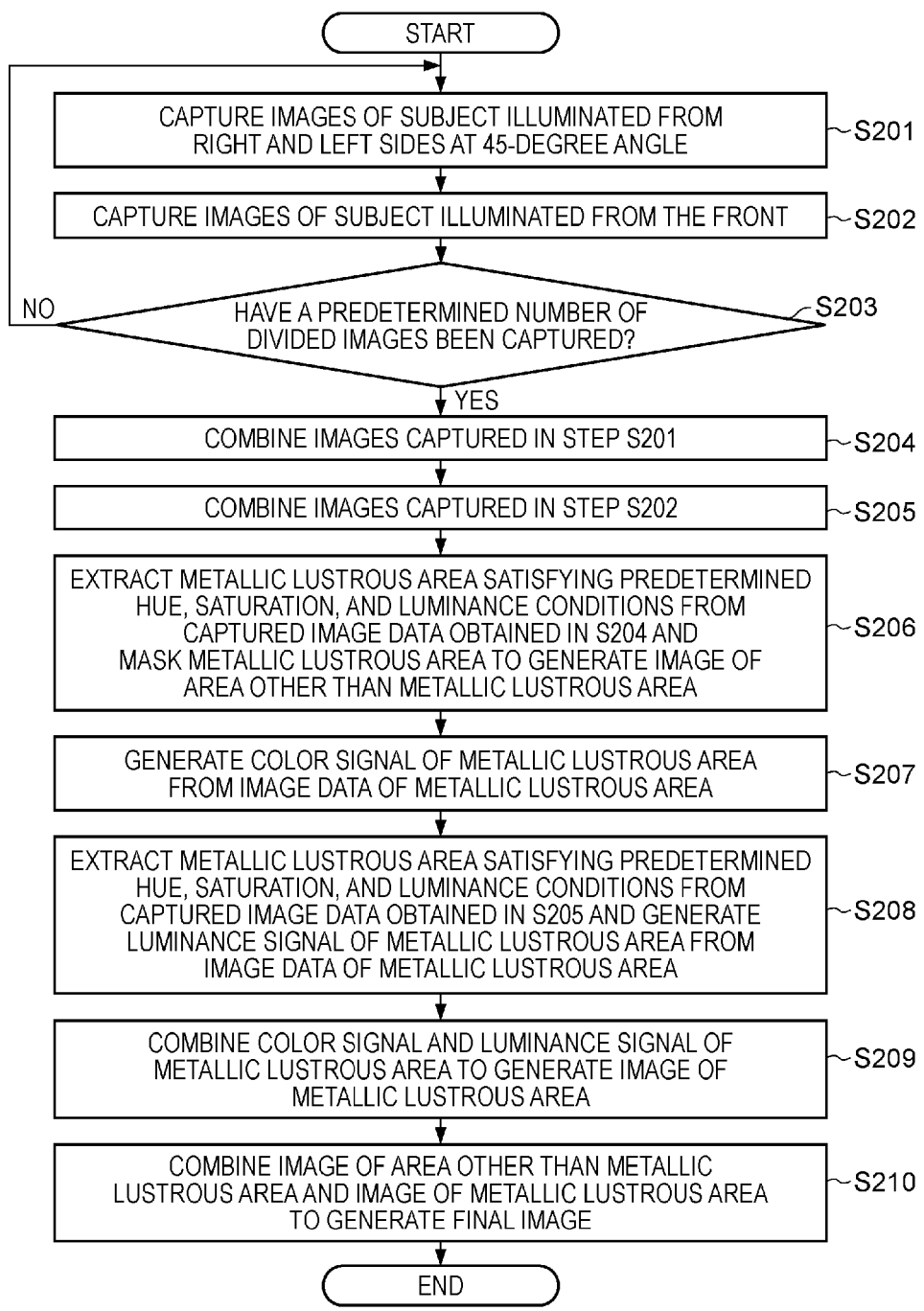

IMAGE PICKUP SYSTEM, IMAGE CAPTURING METHOD, AND COMPUTER-READBALE STORAGE MEDIUM STORING PROGRAM FOR PERFORMING IMAGE CAPTURING METHOD

CROSS REFERENCE OF RELATED APPLICATIONS

This application is a Continuation of U.S. patent application Ser. No. 12/395,079 filed Feb. 27, 2009 which claims the benefit of Japanese Application No. 2008-053628 filed Mar. 4, 2008, which are hereby incorporated by reference herein in their entirety.

BACKGROUND OF THE INVENTION

1. Field of the Invention

The present invention relates to a technique for capturing an image of a partially lustrous subject.

2. Description of the Related Art

It is very difficult to capture images of metallic lustrous subjects such as folding screens (byobu) or sliding screens (fusuma) coated with gold leaf. Image capturing of such a metallic lustrous subject is similar to image capturing of a mirror. Accordingly, if image capturing of a metallic lustrous subject is performed, a portion at which light emitted from a light source is reflected is present in a captured image of the subject. In this case, the color and gradation of the captured image of the subject differs from the actual color and gradation of the subject.

For example, if light is emitted toward a metallic lustrous subject from the front side of the subject at the time of image capturing, high-intensity light specularly reflected from the subject enters a camera and a portion having a color of a light source is present in a captured image of the subject. On the other hand, if light is emitted toward a metallic lustrous subject from an oblique direction with respect to the subject at the time of image capturing, the color of a metallic luminous surface of the subject can be accurately reproduced, but a gradation characteristic is reduced and a captured image of the subject loses a metallic luster.

A method of capturing an image of a metallic lustrous subject using two light sources has been proposed (see, Japanese Patent Laid-Open No. 05-80394). Light emitted from one of these light sources is transmitted to the subject from the front side of the subject via a screen having a white diffusion effect so as to illuminate the subject with white light. Strobe light emitted from the other one of these light sources is directly transmitted to the subject from an oblique direction without using a screen. In order to reproduce the color, gradation, and luster of the subject, lights transmitted from two directions are combined.

However, in such a method of combining lights transmitted from two directions and performing image capturing using the combined light, if the positional relationship between these light sources or the combination ratio between lights from these light sources varies, the state of a metallic lustrous surface of the subject varies widely. If lights transmitted from two directions are combined, the effects of the lights may cancel each other. Accordingly, if a desirable image cannot be captured, it is required to repeatedly change the positional relationship between these light sources or the combination ratio between lights transmitted from these light sources until a desirable image can be obtained.

SUMMARY OF THE INVENTION

The present invention provides an image pickup system and an image capturing method capable of reproducing the color and gradation of a lustrous portion of a partially lustrous subject without requiring a user to adjust the balance between light sources at the time of image capturing of the subject.

According to an embodiment of the present invention, there is provided an image pickup system including: a first illumination unit configured to emit light toward a subject at a first angle so as to illuminate the subject; a second illumination unit configured to emit light toward the subject at a second angle different from the first angle so as to illuminate the subject; an image pickup unit configured to capture an image of the subject; a control unit configured to cause only the first illumination unit to emit light at the time of image capturing of the subject performed by the image pickup unit so as to obtain a first captured image, and cause only the second illumination unit to emit light at the time of image capturing of the subject performed by the image pickup unit so as to obtain a second captured image; and an image processing unit configured to associate the first captured image with the second captured image.

According to an embodiment of the present invention, there is provided an image capturing method using a first illumination unit configured to emit light toward a subject at a first angle so as to illuminate the subject, a second illumination unit configured to emit light toward the subject at a second angle different from the first angle so as to illuminate the subject, and an image pickup unit configured to capture an image of the subject. The image capturing method includes: causing only the first illumination unit to emit light at the time of image capturing of the subject performed by the image pickup unit so as to obtain a first captured image; causing only the second illumination unit to emit light at the time of image capturing of the subject performed by the image pickup unit so as to obtain a second captured image; and associating the first captured image with the second captured image.

According to an embodiment of the present invention, there is provided a computer-readable storage medium having stored thereon a program for controlling an image pickup system including a first illumination unit configured to emit light toward a subject at a first angle so as to illuminate the subject, a second illumination unit configured to emit light toward the subject at a second angle different from the first angle so as to illuminate the subject, and an image pickup unit configured to capture an image of the subject. The program includes: causing only the first illumination unit to emit light at the time of image capturing of the subject performed by the image pickup unit so as to obtain a first captured image; causing only the second illumination unit to emit light at the time of image capturing of the subject performed by the image pickup unit so as to obtain a second captured image; and associating the first captured image with the second captured image.

Further features of the present invention will become apparent from the following description of exemplary embodiments with reference to the attached drawings.

BRIEF DESCRIPTION OF THE DRAWINGS

FIG. 5 illustrates a process of combining pieces of obtained image data.

FIG. 6 illustrates a process of generating printing plates from image data.

FIG. 7 is a flowchart illustrating an image capturing process performed by an image pickup system according to another embodiment of the present invention.

DESCRIPTION OF THE EMBODIMENTS

Embodiments of the present invention will be described in detail below with reference to the accompanying drawings.

Figure 1A:
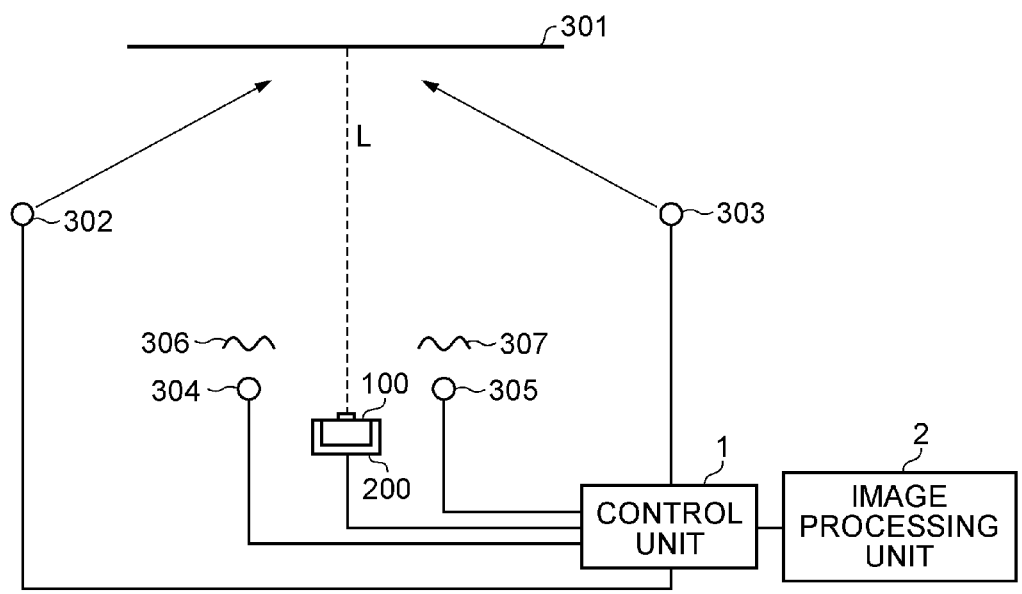
FIGS. 1A and 1B illustrate an exemplary configuration of an image pickup system.
Figure 1B:
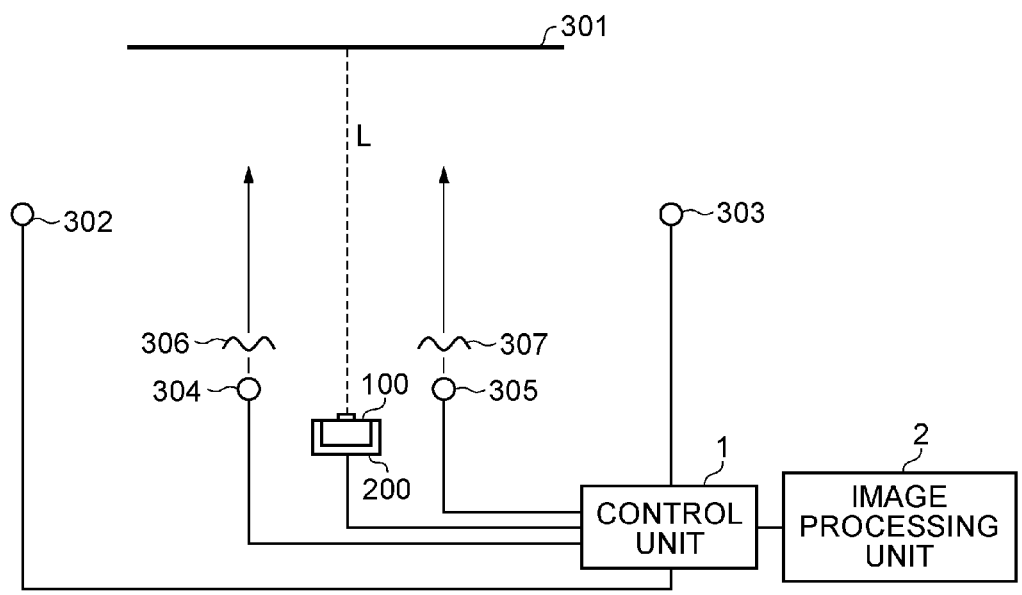

FIGS. 1A and 1B illustrate a configuration of an image pickup system according to an exemplary embodiment. An image pickup system according to this embodiment is suitable for image capturing of a partially metallic lustrous subject 301 such as a gilded or gold-painted folding screen (byobu) or sliding screen (fusuma).

Referring to FIGS. 1A and 1B, an image pickup apparatus (digital camera) 100 for capturing an image of the subject 301 and a pan head 200 for rotating the digital camera 100 in pitch and yaw directions are illustrated.

Light sources 302 and 303 are used for emitting light toward the subject 301 from a diagonally left or right direction with respect to the subject 301 (from a point located so that an angle formed between an image capturing optical axis L and the line joining the point to the intersection of the image capturing optical axis L and the subject 301 is an angle larger than 45°), and are disposed symmetrically with respect to the image capturing optical axis L. In this embodiment, the image capturing optical axis L means an image capturing optical axis of the digital camera 100 when the digital camera 100 faces the subject 301, that is, the image capturing optical axis L is orthogonal to the subject 301.

Light sources 304 and 305 for emitting light toward the subject 301 from the substantial front side of the subject 301 are symmetrically disposed with respect to the image capturing optical axis L. White diffusion plates 306 and 307 for diffusing irradiated light are disposed in front of the light sources 304 and 305, respectively, and are, for example, tracing paper.

A control unit 1 is configured to control the digital camera 100, the pan head 200, and the light sources 302 to 305. As illustrated in FIG. 1A, the control unit 1 causes only the light sources 302 and 303 to emit light and causes the digital camera 100 to perform image capturing of the subject 301, thus obtaining image data. As illustrated in FIG. 1B, the control unit 1 causes only the light sources 304 and 305 to emit light and causes the digital camera 100 to perform image capturing of the subject 301, thus obtaining image data.

An image processing unit 2 associates the image data obtained by image capturing performed in the state illustrated in FIG. 1A with the image data obtained by image capturing performed in the state illustrated in FIG. 1B. More specifically, the image processing unit 2 combines these pieces of image data so as to reproduce all of the color, gradation, and luster of the subject 301.

Figure 2:
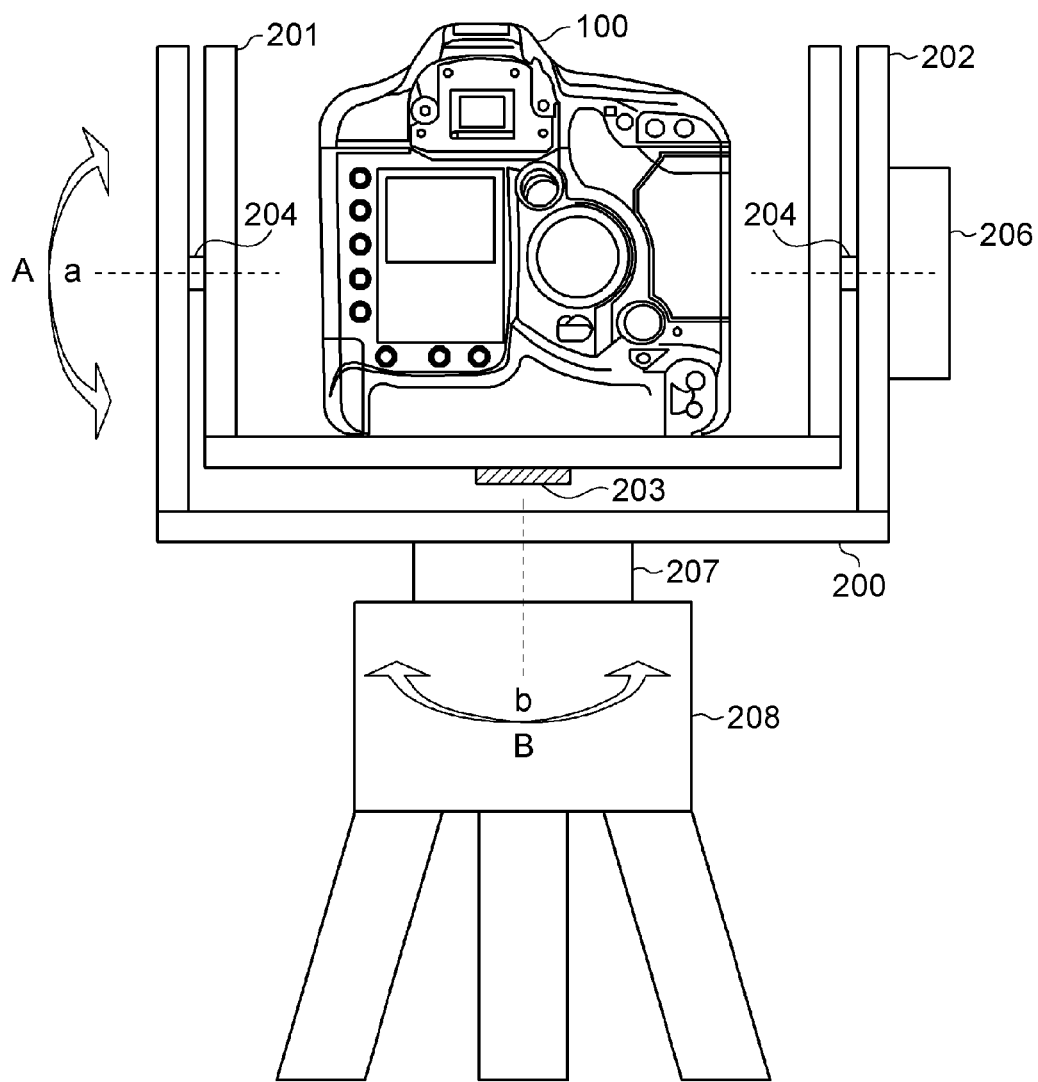
FIG. 2 illustrates a digital camera and a pan head used in an image pickup system.

FIG. 2 illustrates the digital camera 100 and the pan head 200 used in an image pickup system according to this embodiment. The pan head 200 is mainly composed of a pitch rotation member 201 and a yaw rotation member 202. The digital camera 100 is fixed on the pitch rotation member 201 with a fixing screw 203.

The pitch rotation member 201 is coupled to the yaw rotation member 202 via a rotating shaft 204 on the opposite sides of the pitch rotation member 201. The pitch rotation member 201 can rotate about a rotation axis a in a pitch direction (direction indicated by an arrow A). The yaw rotation member 202 is provided with a motor 206 for rotating the pitch rotation member 201 in the pitch direction. The motor 206 is configured to rotate the pitch rotation member 201 and fix the pitch rotation member 201 at a position in the pitch direction with respect to the yaw rotation member 202.

The yaw rotation member 202 is supported by a motor 207 at the bottom thereof, and can rotate about a rotation axis b in a yaw direction (direction indicated by an arrow B).

The pan head 200 capable of rotating about two axes is fixed to a tripod 208, and can be moved to a predetermined position with respect to a subject.

Figure 3A:
FIGS. 3A, 3B, and 3C illustrate a divisional image capturing process.

In this embodiment, using the digital camera 100 and the pan head 200, divisional image capturing is performed. A divisional image capturing process will be described with reference to FIGS. 3A, 3B, and 3C. It is assumed that divisional image capturing of an image capturing subject illustrated in FIG. 3A is performed using the digital camera 100 and the pan head 200 illustrated in FIG. 2.

Figure 3B:
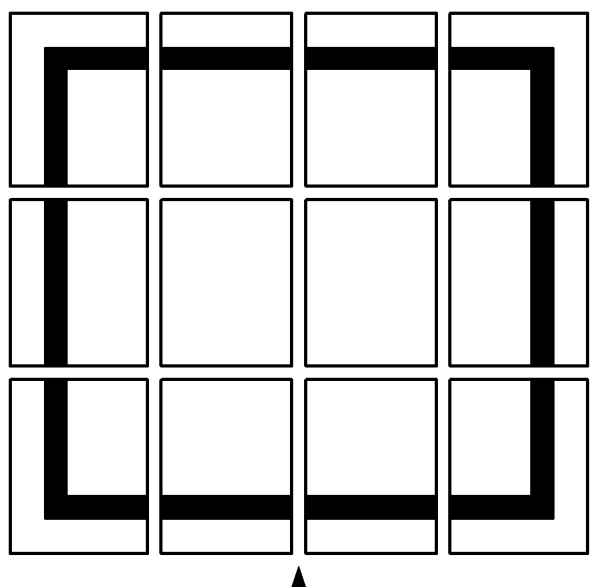
Figure 3C:

In divisional image capturing, it is required to divide an image capturing area of the subject into sub-image capturing areas so that portions of these sub-image capturing areas overlap each other. In this embodiment, the image capturing area of the subject is divided into three sub-image capturing areas in the horizontal direction and four sub-image capturing areas in the vertical direction, and a user performs the divisional image capturing of these twelve sub-image capturing areas using the digital camera 100 disposed at a normal position while moving the pan head 200. As a result, as illustrated in FIG. 3B, twelve images are captured. In order to combine these twelve images (divided images) obtained by divisional image capturing, the overlapping portions are detected. On the basis of the detected overlapping portions, these twelve images are combined. As a result, a combined image illustrated in FIG. 3C is generated.

If a subject has a metallic lustrous area having a reflectivity higher than a predetermined reflectivity, it is required to consider how to use light sources for illuminating the subject. If image capturing is performed in a flash mode, a light incident direction to the subject is generally changed so as to prevent light emitted from a light source from being specularly reflected from the subject. As illustrated in FIG. 1A, image capturing is performed using the light sources 302 and 303 for emitting light toward the subject 301 from a diagonally left or right direction with respect to the subject 301. As a result, the color of the subject 301 can be accurately reproduced. However, in the case of a metallic lustrous subject, light transmitted from an oblique direction with respect to the subject is not reflected from the subject to the digital camera 100. Accordingly, a gradation characteristic is reduced, and a captured image of the subject loses the luster.

Therefore, as illustrated in FIG. 1B, by causing the light sources 304 and 305 to emit light toward the subject 301 from the front side of the subject 301, the light emitted from the light sources 304 and 305 is specularly reflected from the subject 301. As a result, a gradation characteristic required for the reproduction of the luster of the subject 301 can be obtained.

Figure 4:
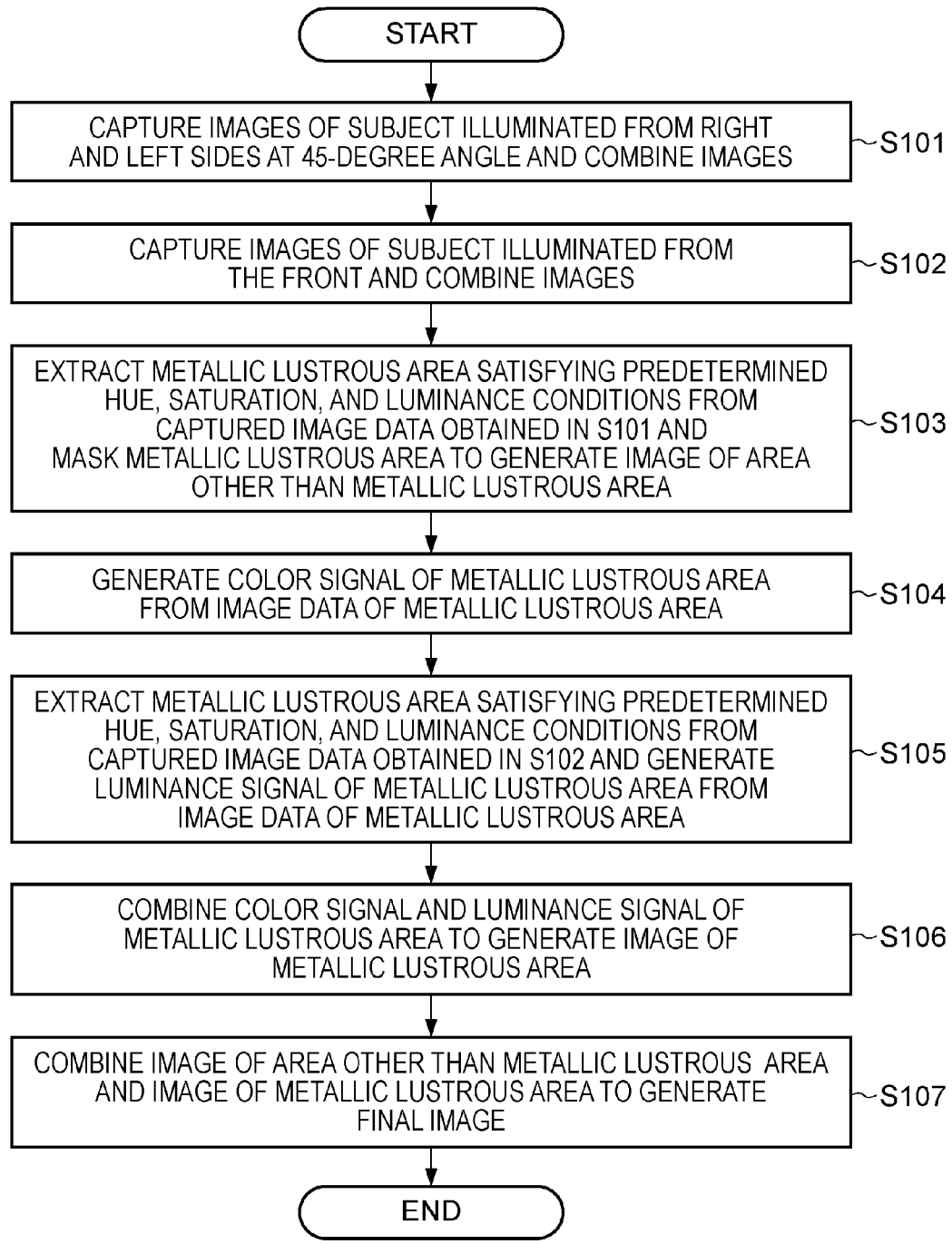
FIG. 4 is a flowchart illustrating an image capturing process performed by an image pickup system according to an exemplary embodiment of the present invention.

An image capturing process performed by an image pickup system according to this embodiment will be described with reference to FIGS. 4 and 5. FIG. 4 is a flowchart illustrating an image capturing process performed by an image pickup system according to this embodiment. FIG. 5 illustrates a process of combining pieces of image data obtained in the image capturing process illustrated in FIG. 4.

In step S101, an image pickup system causes the light sources 302 and 303 for emitting light toward the subject 301 from a diagonally left or right direction with respect to the subject 301 to emit light in synchronization with each other (without causing the light sources 304 and 305 to emit light), performs divisional image capturing, and combines divided images obtained from the divisional image capturing. As a result, captured image data A (501) illustrated in FIG. 5 is obtained.

In step S102, the image pickup system causes the light sources 304 and 305 for emitting light toward the subject 301 from the front side of the subject 301 to emit light in synchronization with each other (without causing the light sources 302 and 303 to emit light), performs divisional image capturing, and combines divided images obtained from the divisional image capturing. As a result, captured image data B (505) illustrated in FIG. 5 is obtained.

In step S103, the image pickup system divides the captured image data A (501) obtained in step S101 into metallic lustrous area (first area) image data 503 and non-metallic lustrous area (second area) image data 502. In an image corresponding to the captured image data A (501), an image portion satisfying predetermined hue, saturation, and luminance conditions is defined as a metallic lustrous area. More specifically, using the YUV space, an area defined as the metallic lustrous area is set. For example, in the UV space, if the horizontal axis denotes U and the vertical axis denotes V, a hue of gold ranges from 150 degrees to 180 degrees. As a luminance (Y) value of gold, a value equal to or larger than 150/255 is set. Using the above-described values, the metallic lustrous area can be extracted. By masking a portion corresponding to the metallic lustrous area image data 503 included in the captured image data A (501), the non-metallic lustrous area image data 502 can be obtained.

In step S104, a metallic lustrous area color signal 504 is generated from the metallic lustrous area image data 503 extracted in step S103.

In step S105, using the same method as that performed in steps S103 and S104, the captured image data B (505) obtained in step S102 is divided into a metallic lustrous area (first area) image data 506 and a non-metallic lustrous area (second area) image data 507. The image pickup system generates a metallic lustrous area luminance signal 508 from the metallic lustrous area image data 506. In step S105, the metallic lustrous area extraction, which has been performed upon the captured image data A, is performed again upon the captured image data B. However, it may be determined whether there is a match between the captured image data A and the captured image data B, and on the basis of the determination result, divided areas obtained from the metallic lustrous area extraction performed upon the captured image data A may be changed to be applied to the captured image data B.

In step S106, the image pickup system combines the metallic lustrous area color signal 504 generated in step S104 from the captured image data A (501) and the metallic lustrous area luminance signal 508 generated in step S105 from the captured image data B (505) so as to generate image data 509 for the metallic lustrous area of the subject 301.

In step S107, the image pickup system combines the non-metallic lustrous area image data 502 generated in step S103 from the captured image data A (501) and the image data 509 for the metallic lustrous area of the subject 301 which has been generated in step S106 so as to generate image data 510 of a final image.

As described previously, the image pickup system separately causes a set of the light sources 302 and 303 and a set of the light sources 304 and 305 to emit light toward the partially metallic lustrous subject 301 at the time of image capturing so as to generate characteristic signals, and combines these characteristic signals. As a result, the image pickup system can obtain appropriate image data by controlling the luminance signal and color signal of a metallic lustrous surface without requiring a user to adjust the balance between these light sources at the time of image capturing.

The image data combination process performed at the time of image capturing has been described with reference to FIG. 5. If a particular color is used for the metallic lustrous area at the time of printing of image data, different plates may be used for the metallic lustrous area and the non-metallic lustrous area. That is, as illustrated in FIG. 6, by masking a portion corresponding to the metallic lustrous area image data 503 included in the captured image data A (501), the non-metallic lustrous area image data 502 is obtained. A non-metallic lustrous area plate 511 is generated from the non-metallic lustrous area image data 502. By combining the metallic lustrous area color signal 504 generated from the captured image A (501) and the metallic lustrous area luminance signal 508 generated from the captured image B (505), a metallic lustrous area plate 512 is generated.

As described previously with reference to FIG. 2, if divisional image capturing is performed, it is required to combine divided images. Furthermore, in the present invention, it is required to combine two images so as to generate each type of signal. Accordingly, it is desirable that an unfavorable factor in combining images at the time of image capturing be removed.

In the previous embodiment, after divisional image capturing of a subject has been performed using the light sources 302 and 303 on the left and right sides of the subject, divisional image capturing of the subject is performed using the light sources 304 and 305 on the front side of the subject. In this case, at the time of the divisional image capturing using the light sources 302 and the 303 and the divisional image capturing using the light sources 304 and 305, the pan head 200 repeatedly performs the same operation. Accordingly, if the same operation cannot be accurately repeated, the image pickup system may not obtain images captured at the same position and obtain an accurate image combination result.

In this embodiment, each time image capturing of each of sub-image capturing areas is performed, switching between the set of the light sources 302 and 303 and the set of the light sources 304 and 305 is performed.

FIG. 7 is a flowchart illustrating an image capturing process performed by an image pickup system according to this embodiment. In step S201, the image pickup system causes the light sources 302 and 303 for emitting light toward the subject 301 from an oblique direction with respect to the subject 301 to emit light in synchronization with each other (without causing the light sources 304 and 305 to emit light) at the time of image capturing of one of the sub-image capturing areas.

In step S202, the image pickup system causes the light sources 304 and 305 for emitting light toward the subject 301 from the front side of the subject 301 to emit light in synchronization with each other (without causing the light sources 302 and 303 to emit light) without changing the position of the pan head 200, that is, at the same divisional image capturing point as that in step S201, at the time of image capturing of the above-described sub-image capturing area.

In step S203, the image pickup system determines whether image capturing of all of the sub-image capturing areas (twelve sub-image capturing areas in the exemplary case illustrated in FIG. 2) have been performed. If it is determined in step S203 that image capturing of all of the sub-image capturing areas have not yet been performed, the image pickup system moves the pan head 200 and repeats the process from step S201 to step S202 at the next divisional image capturing point.

If it is determined in step S203 that image capturing of all of the sub-image capturing areas have already been performed, the image pickup system combines divided images obtained from the image capturing performed in step S201 so as to obtain image data in step S204. As a result, as illustrated in FIG. 5, the captured image data A (501) is obtained.

In step S205, the image pickup system combines divided images obtained from the image capturing performed in step S202 so as to obtain image data. As a result, as illustrated in FIG. 5, the captured image data B (505) is obtained.

The process from step S206 to step S210 is the same as the process from step S103 to step S107 described previously in the previous embodiment. That is, in step S206, the captured image data A (501) obtained in step S204 is divided into the metallic lustrous area image data 503 and the non-metallic lustrous area image data 502.

In step S207, the metallic lustrous area color signal 504 is generated from the metallic lustrous area image data 503 extracted in step S206.

In step S208, the captured image data B (505) obtained in step S205 is divided into the metallic lustrous area image data 506 and the non-metallic lustrous area image data 507. The metallic lustrous area luminance signal 508 is generated from the metallic lustrous area image data 506.

In step S209, the image pickup system combines the metallic lustrous area color signal 504 generated in step S207 from the captured image data A (501) and the metallic lustrous area luminance signal 508 generated in step S208 from the captured image data B (505) so as to generate the image data 509 for the metallic lustrous area of the subject 301.

In step S210, the image pickup system combines the non-metallic lustrous area image data 502 generated in step S206 from the captured image data A (501) and the image data 509 generated in step S209 so as to generate the image data 510 of a final image.

According to this embodiment, since the digital camera 100 performs image capturing using the light sources 302 and 303 and image capturing using the light sources 304 and 305 at the same position and combines obtained pieces of captured image data, an accurate combination result can be obtained.

In the previous and present embodiments, it is assumed that the digital camera 100 is rotated by the pan head 200 in the pitch and yaw directions and performs divisional image capturing of a subject. In the above description, the image capturing optical axis L means the image capturing optical axis of the digital camera 100 when the digital camera 100 faces the subject 301. However, if the pan head 200 is rotated, the image capturing optical axis L is not orthogonal to the surface of the subject 301. Accordingly, even if the pan head 200 is rotated at the time of divisional image capturing, it is desirable that the light sources 302 and 303 be disposed so that an angle formed between the image capturing optical axis L and the line joining the position of each of the light sources 302 and 303 to the intersection of the image capturing optical axis L and the subject 301 is an angle larger than 45°. In the above-described embodiments, although an exemplary case has been described in which image capturing of a partially metallic lustrous subject is performed, the present invention is not limited thereto. Image capturing of a lustrous subject made of another type of material such as specific resin or stone may be performed. In this case, for example, like in the case of a metallic lustrous subject, an image portion satisfying predetermined hue, saturation, and luminance conditions may be specified as a lustrous area as described previously with reference to FIGS. 4 and 5.

The present invention may be achieved in such a manner that a computer-readable storage medium storing program code (software) for implementing the functions of the above-described embodiments is supplied to a system or an apparatus, and a computer (or a CPU or MPU) of the system or apparatus reads out the program code from the storage medium and executes the read program code.

In this case, the program code read out from the storage medium achieves the functions of the above-described embodiments. The program code is not necessarily a single program. It may be multiple programs and may include compiled code, interpreted code, scripts and the like.

As the storage medium for providing program code, for example, a flexible disk, a hard disk, an optical disc, a magneto-optical disk, a CD-ROM, a CD-R, a magnetic tape, a nonvolatile memory card, or a ROM may be used.

The computer executes the read program code to achieve the functions of the above-described embodiments. Furthermore, an OS (basic system or Operating System) or the like running on the computer may perform part or all of actual processing under instructions of the program code to achieve the functions of the above-described embodiments.

Still furthermore, the program code read out from the storage medium may be written to a memory provided in a function expansion board inserted into the computer or in a function expansion unit connected to the computer. Subsequently, a CPU or the like provided in the function expansion board or the function expansion unit may perform part or all of actual processing under instructions of the program code so as to achieve the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image pickup system comprising:
an illumination unit configured to emit light to a subject;
an image pickup unit configured to capture an image of the subject;
a control unit configured to obtain, from the image pickup unit, a first captured image of the subject to which the illumination unit emits light at an angle and a second captured image of the subject to which the illumination unit emits light at a different angle from the angle at which light is emitted to the subject of the first captured image; and
an image signal generation unit configured to generate an image signal using a luminance signal of the first captured image as a luminance signal of the image signal and a color signal of the second captured image as a color signal of the image signal,
wherein the image signal generation unit generates the image signal that corresponds to both an area of the first captured image and an area of the second captured image which satisfy a predetermined hue condition, a predetermined saturation condition and a predetermined luminance condition.

2. The image pickup system according to claim 1, further comprising:
a division unit configured to divide the first captured image into a first area and a second area in accordance with at least any one of a hue condition, a saturation condition and a luminance condition,
wherein the image signal generation unit generates image data for the first area.

3. The image pickup system according to claim 1, wherein the predetermined hue condition, the predetermined saturation condition and the predetermined luminance condition correspond to a condition of a metallic lustrous subject.

4. The image pickup system according to claim 2, further comprising a combination unit configured to combine image data for the second area of the second captured image divided by the division unit and image data for the first area generated by the image signal generating unit so as to generate one sheet of combined image data.

5. The image pickup system according to claim 2, wherein the first area has a reflectivity higher than a predetermined reflectivity among the areas in the first captured image and the second captured image.

6. The image pickup system according to claim 1, wherein the first captured image is captured by the illumination unit emitting light to the subject from a front side of the subject as viewed from the image pickup unit, and the second captured image is captured by the illumination unit emitting light to the subject from an oblique direction.

7. An image capturing method using an illumination unit configured to emit light to a subject and an image pickup unit configured to capture an image of the subject, the image capturing method comprising:
causing the illumination unit to emit light to the subject at an angle and the image pickup unit to capture a first captured image;
causing the illumination unit to emit light to the subject at a different angle from the angle at which light is emitted to capture the first captured image and the image pickup unit to capture a second captured image; and
generating an image signal using a luminance signal of the first captured image as a luminance signal of the image signal and a color signal of the second captured image as a color signal of the image signal,
wherein the generated image signal corresponds to both an area of the first captured image and an area of the second captured image which satisfy a predetermined hue condition, a predetermined saturation condition and a predetermined luminance condition.

8. A non-transitory computer-readable storage medium having stored thereon a program for controlling an image pickup system including an illumination unit configured to emit light to a subject and an image pickup unit configured to capture an image of the subject, the program stored on the computer-readable storage medium comprising:
causing the illumination unit to emit light to the subject at an angle and the image pickup unit to capture a first captured image;
causing the illumination unit to emit light to the subject at a different angle from the angle at which light is emitted to capture the first captured image and the image pickup unit to capture a second captured image; and
generating an image signal using a luminance signal of the first captured image and a color signal of the second captured image,
wherein the generated image signal corresponds to both an area of the first captured image and an area of the second captured image which satisfy a predetermined hue condition, a predetermined saturation condition and a predetermined luminance condition.

9. An image pickup system comprising:
an illumination unit configured to emit light to a subject;
an image pickup unit configured to capture an image of the subject;
a control unit configured to obtain, from the image pickup unit, a first captured image of the subject to which the illumination unit emits light at an angle and a second captured image of the subject to which the illumination unit emits light at a different angle from the angle at which light is emitted to the subject of the first captured image; and
an image signal generation unit configured to generate an image signal using a luminance signal of the first captured image as a luminance signal of the image signal and a color signal of the second captured image as a color signal of the image signal,
wherein the image signal generation unit generates the image signal that corresponds to both an area of the first captured image and an area of the second captured image, which satisfy a predetermined luminance condition, a predetermined saturation condition and a predetermined hue condition, as a condition of a metallic lustrous subject.

10. An image capturing method using an illumination unit configured to emit light to a subject and an image pickup unit configured to capture an image of the subject, the image capturing method comprising:
causing the illumination unit to emit light to the subject at an angle and the image pickup unit to capture a first captured image;
causing the illumination unit to emit light to the subject at a different angle from the angle at which light is emitted to capture the first captured image and the image pickup unit to capture a second captured image; and
generating an image signal using a luminance signal of the first captured image as a luminance signal of the image signal and a color signal of the second captured image as a color signal of the image signal,
wherein the generated image signal corresponds to both an area of the first captured image and an area of the second captured image which satisfy a predetermined luminance condition, a predetermined saturation condition and a predetermined hue condition, as a condition of a metallic lustrous subject.

11. A non-transitory computer-readable storage medium having stored thereon a program for controlling an image pickup system including an illumination unit configured to emit light to a subject and an image pickup unit configured to capture an image of the subject, the program stored on the computer-readable storage medium comprising:
causing the illumination unit to emit light to the subject at an angle and the image pickup unit to capture a first captured image;
causing the illumination unit to emit light to the subject at a different angle from the angle at which light is emitted to capture the first captured image and the image pickup unit to capture a second captured image; and
generating an image signal using a luminance signal of the first captured image as a luminance signal of the image signal and a color signal of the second captured image as a color signal of the image signal, wherein the generated image signal corresponds to both an area of the first captured image and an area of the second captured image which satisfy a predetermined luminance condition, a predetermined saturation condition and a predetermined hue condition, as a condition of a metallic lustrous subject.

12. An image processing method comprising:

obtaining a first captured image of the subject by an image capture unit to which an illumination unit emits light at an angle;

obtaining a second captured image of the subject by the image capture unit to which the illumination unit emits light at a different angle from the angle at which light is emitted to the subject of the first captured image; and generating an image signal using a luminance signal of the first captured image as a luminance signal of the image signal and a color signal of the second captured image as a color signal of the image signal, wherein the generated image signal corresponds to both an area of the first captured image and an area of the second captured image which satisfy a predetermined hue condition, a predetermined saturation condition and a predetermined luminance condition.

13. A non-transitory computer-readable storage medium having stored thereon a program for controlling an image processing method, the program stored on the computer-readable storage medium comprising:

obtaining a first captured image of the subject by an image capture unit to which an illumination unit emits light at an angle;

obtaining a second captured image of the subject by the image capture unit to which the illumination unit emits light at a different angle from the angle at which light is emitted to the subject of the first captured image; and generating an image signal using a luminance signal of the first captured image as a luminance signal of the image signal and a color signal of the second captured image as a color signal of the image signal, wherein the generated image signal corresponds to both an area of the first captured image and an area of the second captured image which satisfy a predetermined hue condition, a predetermined saturation condition and a predetermined luminance condition.

* * * * *